United States Patent
Clarke

(10) Patent No.: US 11,155,354 B2
(45) Date of Patent: Oct. 26, 2021

(54) AIRBAG SYSTEMS

(71) Applicant: Sikorsky Aircraft Corporation, Stratford, CT (US)

(72) Inventor: Charles W. Clarke, Sag Harbor, NY (US)

(73) Assignee: Sikorsky Aircraft Corporation, Stratford, CT (US)

( * ) Notice: Subject to any disclaimer, the term of this patent is extended or adjusted under 35 U.S.C. 154(b) by 684 days.

(21) Appl. No.: 15/727,985

(22) Filed: Oct. 9, 2017

(65) Prior Publication Data

US 2018/0127102 A1 May 10, 2018

Related U.S. Application Data

(60) Provisional application No. 62/419,642, filed on Nov. 9, 2016.

(51) Int. Cl.
*B64D 25/00* (2006.01)
*B64C 27/00* (2006.01)

(52) U.S. Cl.
CPC ............ *B64D 25/00* (2013.01); *B64C 27/006* (2013.01); *B64D 2201/00* (2013.01)

(58) Field of Classification Search
CPC .... B64D 25/00; B64D 2201/00; B64C 27/006
See application file for complete search history.

(56) References Cited

U.S. PATENT DOCUMENTS

| | | | | |
|---|---|---|---|---|
| 5,560,568 A | * | 10/1996 | Schmittle | B64C 3/385 244/110 E |
| 5,992,794 A | * | 11/1999 | Rotman | B64C 25/32 244/138 R |
| 6,338,456 B1 | | 1/2002 | Cairo-Iocco et al. | |
| 9,260,192 B2 | | 2/2016 | Lu et al. | |
| 9,452,843 B1 | * | 9/2016 | Lu | B64D 25/00 |
| 9,487,301 B2 | * | 11/2016 | Hill | B64C 25/52 |
| 2005/0275197 A1 | * | 12/2005 | Kaifuki | B60R 21/21656 280/728.3 |
| 2006/0232052 A1 | * | 10/2006 | Breed | B60R 21/013 280/735 |
| 2007/0284863 A1 | * | 12/2007 | Bostick | B60R 21/217 280/741 |
| 2010/0181421 A1 | * | 7/2010 | Albagli | B64C 25/56 244/100 A |

(Continued)

*Primary Examiner* — Valentina Xavier
(74) *Attorney, Agent, or Firm* — Michael Best & Friedrich LLP

(57) ABSTRACT

An airbag system includes a VTOL aircraft fuselage having an airbag compartment defined within the fuselage. A protective cover defines a portion of the exterior surface of the fuselage. The protective cover encloses at least a portion of the airbag compartment. An airbag is folded within the airbag compartment secured to a point on the fuselage. A method for deploying an airbag in an aircraft includes sending a signal to a gas generator to inflate at least one airbag secured within an airbag compartment within a fuselage of an aircraft. The method includes jettisoning off a protective cover from the airbag compartment. The method includes inflating the airbag with the gas generator to extend outside of the airbag compartment to attenuate forces and cushion the aircraft upon ground impact.

11 Claims, 3 Drawing Sheets

(56) References Cited

U.S. PATENT DOCUMENTS

| 2010/0206983 A1* | 8/2010 | Tho | B64D 25/00 |
| | | | 244/100 A |
| 2011/0204181 A1* | 8/2011 | Hill | B64D 25/00 |
| | | | 244/100 A |
| 2015/0217713 A1* | 8/2015 | Vasseur | B60R 21/216 |
| | | | 280/728.3 |

* cited by examiner

AIRBAG SYSTEMS

CROSS-REFERENCE TO RELATED APPLICATION

This application claims the benefit of priority under 35 U.S.C. § 119(e) to U.S. Provisional Application No. 62/419,642, filed Nov. 9, 2016, the contents of which are incorporated by reference herein in their entirety.

BACKGROUND OF THE INVENTION

Field of the Invention

The present disclosure relates to airbag systems, and more particularly airbag systems on aircraft, for example, rotorcraft.

Description of Related Art

Some aircraft, for example, rotorcraft, include airbag systems, such as cockpit airbag systems. Some prototype rotorcraft include airbag systems mounted exterior to a rotorcraft fuselage to attenuate forces and cushion the rotorcraft upon ground impact. External airbag systems have demonstrated vertical aircraft crash protection on rigid, soft soil, and water impact surfaces. These systems are typically stored in their un-inflated condition, folded and fastened underneath and exterior to the fuselage and then inflated before or during a crash impact scenario, for example. During an impeding crash, these airbags are deployed beneath the aircraft before the fuselage contacts ground or other surface.

Such conventional methods and systems have generally been considered satisfactory for their intended purpose. However, there is still a need in the art for improved airbag systems. The present disclosure provides a solution for this need.

SUMMARY OF THE INVENTION

An airbag system includes a VTOL aircraft fuselage having an airbag compartment defined within the fuselage. A protective cover defines a portion of the exterior surface of the fuselage. The protective cover encloses at least a portion of the airbag compartment. An airbag is folded within the airbag compartment secured to a point on the fuselage.

In accordance with some embodiments, an exterior surface of the protective cover is flush with the exterior surface of the fuselage. The system can include a strap to secure the airbag to the point within the fuselage. A first end of the strap is secured to the airbag and a second end of the strap is secured to the point within the fuselage to provide restraint to the airbag during events with combined vertical and forward velocity. The system can include a pyrotechnic device operatively connected to the protective cover to jettison the cover away from the fuselage. The airbag can include an asymmetrical shape.

In accordance with some embodiments, the airbag is one of a plurality of airbags folded within the airbag compartment. The fuselage can include a main body portion defining a longitudinal axis. The plurality of airbags can be arranged in a row along the longitudinal axis of the main body of the fuselage. The system can include a gas generator operatively connected to the airbag to inflate the airbag before ground contact. The system can include an airbag deployment module operatively connected to the gas generator to send a signal to the gas generator to inflate the airbag. Where the airbag is one of a plurality of airbags, the system can include a manifold in fluid communication with each of the plurality of airbags between each of the plurality of airbags and the gas generator to provide gas to each of the plurality of airbags.

In accordance with another aspect, a method for deploying an airbag in an aircraft includes sending a signal to a gas generator to inflate at least one airbag secured within an airbag compartment within a fuselage of an aircraft. The method includes jettisoning off a protective cover from the airbag compartment. The method includes inflating the airbag with the gas generator to extend outside of the airbag compartment to attenuate forces and cushion the aircraft upon ground impact.

In accordance with some embodiments, jettisoning off the protective cover includes triggering a pyrotechnic fastener to apply force to the protective cover and/or applying force to the protective cover with the airbag upon inflation. The method can include securing the airbag to a point within the fuselage with a strap to provide restraint to the airbag during events with combined vertical and forward velocity. Inflating the airbag with the gas generator can include supplying gas from the gas generator through a manifold to the airbag.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
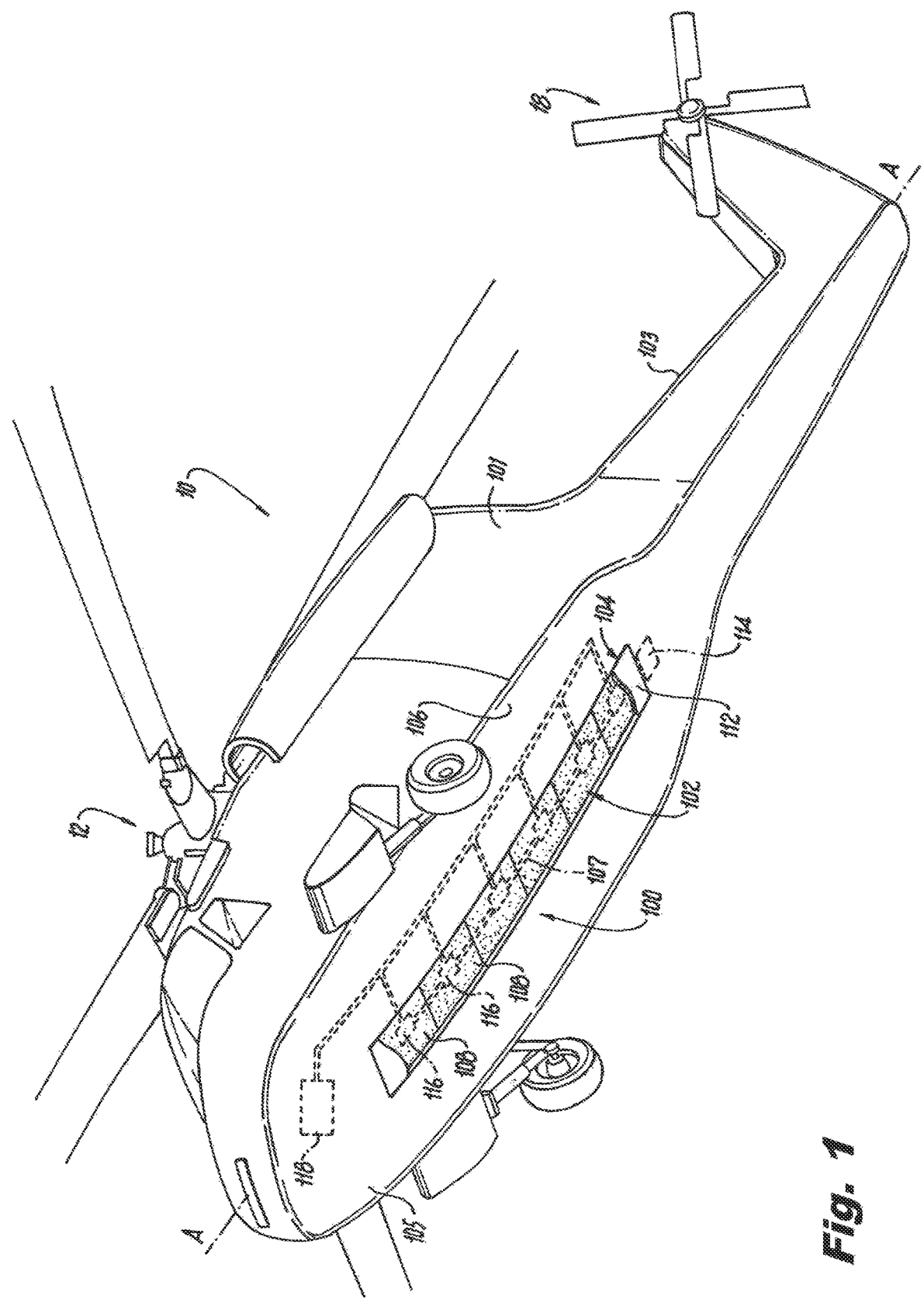
FIG. 1 is a schematic perspective view of an underside of a vertical take-off and landing (VTOL) aircraft, showing an exemplary embodiment of an airbag system constructed in accordance with the present disclosure.

Reference will now be made to the drawings wherein like reference numerals identify similar structural features or aspects of the subject disclosure. For purposes of explanation and illustration, and not limitation, a perspective view of an exemplary embodiment of a vertical takeoff and landing (VTOL) aircraft in accordance with the disclosure is shown in FIG. 1 and is designated generally by reference character 10. Other embodiments of VTOL aircraft in accordance with the disclosure, or aspects thereof, are provided in FIGS. 2-3, as will be described. The systems and methods described herein provide airbag systems and methods with reduced drag and increased ground clearance as compared with other external airbag systems.

As shown in FIG. 1, VTOL aircraft 10 includes a main rotor system 12 and tail rotor system 18. VTOL aircraft 10 also includes an airbag system 100, a fuselage 101 and a tail cone 103. Those skilled in the art will readily appreciate that while airbag system 100 is described in the context of a VTOL aircraft, system 100 can be used in a variety of aerospace and industrial applications. Fuselage 101 has an airbag compartment 102 defined within fuselage 101. System 100 includes a plurality of airbags 108 folded within airbag compartment 102. Since airbags 108 are stowed within compartment 102 within fuselage 101, the aerodynamic drag associated with traditional folded assemblies mounted external to the fuselage is eliminated. This tends to provide airbag systems and methods with reduced drag and increased ground clearance as compared with airbag systems where airbags are stowed external of the fuselage.

With continued reference to FIG. 1, fuselage 101 includes a main body portion 105 defining a longitudinal axis A. Folded airbags 108 are arranged in a row along longitudinal axis A of main body 105 of the fuselage 101. A protective cover 104 encloses airbags 108 within fuselage 101. Generally, cover 104 is strong enough to resist aerodynamic loads experienced during use. Protective cover 104 defines a portion of an exterior surface 106 of fuselage 101. An exterior surface 112 of protective cover 104 is flush with exterior surface 106 of fuselage 101. A common storage location, e.g. airbag compartment 102, for folded airbags 108 tends to reduce the complexity of the inflation system, or allow redundancy. Those skilled in the art will readily appreciate that system 100 can include multiple common airbag compartments, for example, two airbag compartments with three airbags each.

System 100 includes a pyrotechnic device 114, such as a pyrotechnic fastener, or the like, operatively connected to protective cover 104 to jettison protective cover 104 away from fuselage 101. In accordance with some embodiments, a pyrotechnic device can include a series of pyrotechnic bolts that are arranged around the periphery of cover 104, which, in an un-fired state, would secure cover 104 to fuselage 101. A signal to deploy the airbags 108, described below, would first signal to fire the pyrotechnic bolts. It is contemplated that this firing would result in the bolts being cut in two by a guillotine device, allowing cover 104 to just fall off by gravity, or be pushed away from aircraft 10 by inflating airbags 108. Pyrotechnic device 114 may not be necessary depending on the strength of covers 104. In some embodiments, the inflation of the airbags 108 will be sufficient to force covers 104 off of fuselage 101. System 100 includes gas generators 116. Each gas generator 116 is operatively connected to a respective airbag 108 to inflate its respective airbag 108 before ground contact. System 100 includes an airbag deployment module 118 operatively connected to gas generators 116 to send signals to gas generators 116 to inflate their respective airbags 108. Module 118 can be operatively connected to a crash detection system.

As shown in FIG. 1, system 100 includes a manifold 107 in fluid communication with each of airbags 108. Manifold 107 provides fluid communication between each airbag 108 and one or more gas generators 116 to provide gas to each airbag 108. Manifold 107 tends to provide increased reliability for the crash protection equipment, e.g. airbags. For example, if one or more gas generators 116 failed to operate, manifold 107 would allow each airbag 108 to be filled nearly to capacity by the working gas generators 116, instead of having one or more airbags 108 that does not fill at all. It is also contemplated that in some embodiments, a single gas generator 116 can be used to inflate multiple airbags 108 through manifold 107. Using a single gas generator 116 tends to reduce overall weight of system 100.

Figure 2:
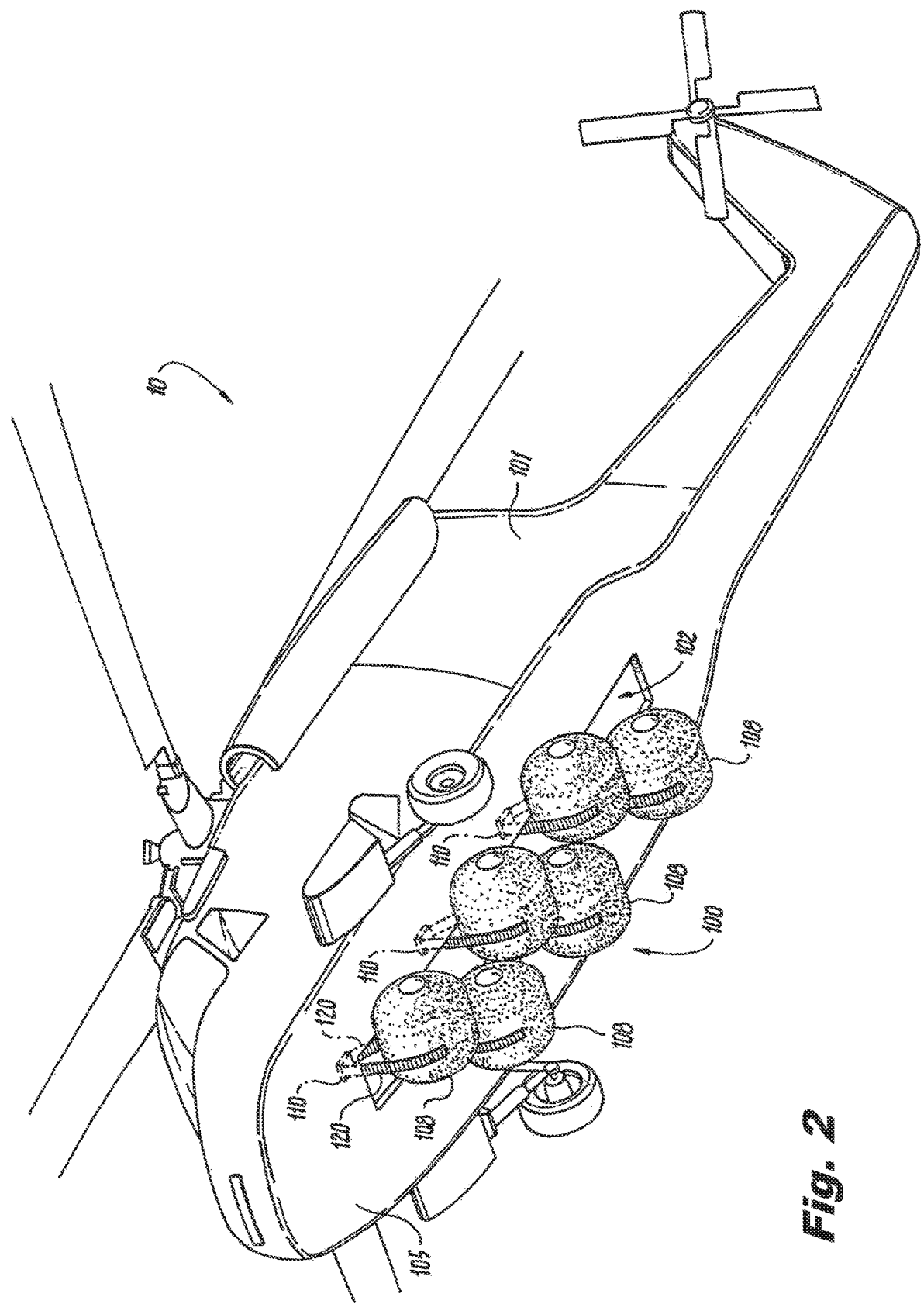
FIG. 2 is a schematic perspective view of the underside of the VTOL aircraft of FIG. 1, showing the airbags in a deployed position.

With reference now to FIG. 2, airbags 108 are shown in the inflated and deployed position. Airbags 108 are deployed exterior to fuselage 101. Each airbag 108 is secured to a respective point 110 on fuselage 101 with straps 120. A first end of each strap 120 is secured to a respective airbag 108 and a second end of each strap 120 is secured to a respective point 110 within fuselage 101 to provide restraint to airbag 108 during events with combined vertical and forward velocity. In accordance with some embodiments, one or more airbags 108 can have an asymmetrical shape. This asymmetry can be used to accommodate for specific aircraft geometry and support needs.

Figure 3:
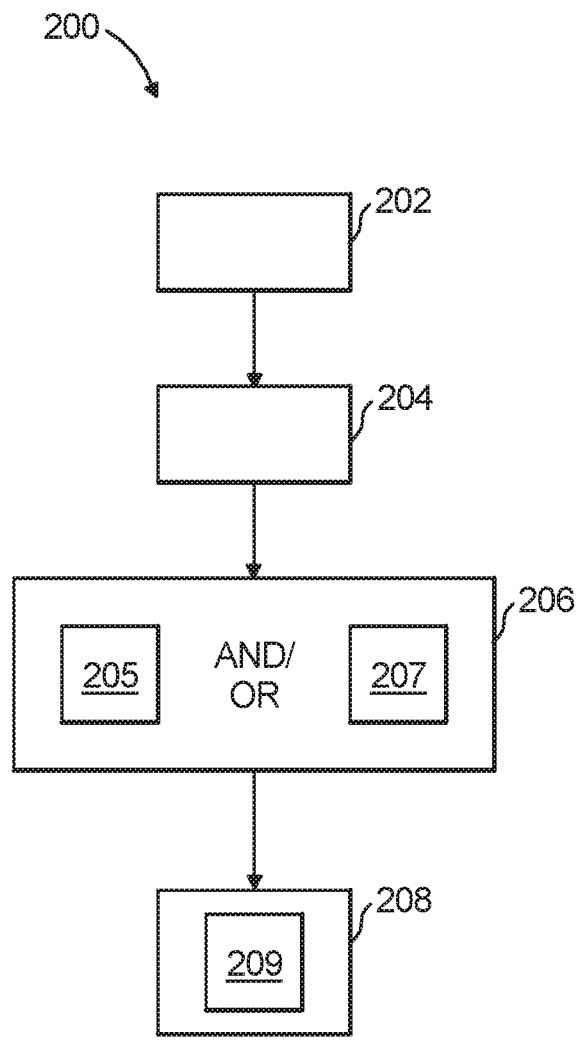
FIG. 3 is a flowchart of an exemplary method for deploying an airbag in an aircraft in accordance with the present disclosure, showing operations to inflate the airbag with the gas generator to attenuate forces and cushion the aircraft upon ground impact.

As shown in FIG. 3, a method 200 for deploying airbags, e.g. airbags 108, in an aircraft, e.g. aircraft 10, includes securing each airbag to a point, e.g. point 110, within a fuselage, e.g. fuselage 101, with straps, e.g. straps 120, to provide restraint to each airbag during events with combined vertical and forward velocity, as shown by box 202. Method 200 includes sending a signal to a gas generator, e.g. gas generator 116, to inflate at least one of the airbags secured within an airbag compartment, e.g. airbag compartment 102, within the fuselage of the aircraft indicated schematically by box 204. Method 200 includes jettisoning off a protective cover, e.g. protective cover 104, from the airbag compartment, indicated schematically by box 206. Jettisoning off the protective cover includes triggering a pyrotechnic fastener, e.g. pyrotechnic fastener 114, to apply force to the protective cover, as indicated schematically by box 205, and/or applying force to the protective cover with the airbag upon inflation, as indicated schematically by box 207. Method 200 includes inflating the airbags with the gas generator to extend outside of the airbag compartment to attenuate forces and cushion the aircraft upon ground impact, indicated schematically by box 208. Those skilled in the art will readily appreciate that the step of inflating the airbag with the gas generator can be performed before, during or after jettisoning off the protective cover. In some embodiments, the step of inflating the airbag with the gas generator includes supplying gas from the gas generator through a manifold, e.g. manifold 107, to the airbag, wherein the manifold is in fluid communication with the airbag, as indicated schematically by box 209.

The methods and systems of the present disclosure, as described above and shown in the drawings, provide for airbag systems and methods with reduced drag and increased ground clearance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:
1. An airbag system comprising:
   a VTOL aircraft fuselage including:
      a main body portion defining a longitudinal axis;
      an airbag compartment defined within the fuselage;
      a protective cover defining a portion of the exterior surface of the fuselage, wherein the protective cover encloses at least a portion of the airbag compartment; and a plurality of airbags folded within the airbag compartment secured to a point on the fuselage and arranged in a row along the longitudinal axis of the main body portion;

at least one gas generator operatively connected to the plurality of airbags to inflate the airbags; and a manifold arranged in fluid communication with the at least one gas generator and with each of the plurality of airbags such that gas provided from the at least one gas generator is distributed within the manifold to each of the plurality of airbags.

2. The system as recited in claim 1, wherein an exterior surface of the protective cover is flush with the exterior surface of the fuselage.

3. The system as recited in claim 1, further comprising a strap to secure each of the plurality of airbags to the point within the fuselage, wherein a first end of the strap is secured to one of the plurality of airbags and a second end of the strap is secured to the point within the fuselage to provide restraint to the airbag during events with combined vertical and forward velocity.

4. The system as recited in claim 1, further comprising a pyrotechnic device operatively connected to the protective cover to jettison the cover away from the fuselage.

5. The system as recited in claim 1, wherein the at least one gas generator is operable to inflate the plurality of airbags before ground contact.

6. The system as recited in claim 5, further comprising an airbag deployment module operatively connected to the at least one gas generator to send a signal to the gas generator to inflate the plurality of airbags.

7. A method for deploying an airbag in an aircraft comprising:

sending a signal to at least one gas generator to inflate at least one of a plurality of airbag secured within a fuselage of an aircraft and arranged in a row along a longitudinal axis of a main body portion of the fuselage, the at least one gas generator being in fluid communication with the plurality of airbags by a manifold operable to distribute air to the at least one airbag of the plurality of airbags;

jettisoning off a protective cover from the fuselage, the protective cover configured to form a portion of the fuselage that resists aerodynamic loads experienced during use; and inflating the at least one airbag with the gas generator to extend outside of the fuselage to attenuate forces and cushion the aircraft upon ground impact.

8. The method as recited in claim 7, wherein jettisoning off the protective cover includes triggering a pyrotechnic fastener to apply force to the protective cover.

9. The method as recited in claim 7, wherein jettisoning off the protective cover includes applying force to the protective cover with the airbag upon inflation.

10. The method as recited in claim 7, further comprising securing the plurality of airbags to a point within the fuselage with a strap to provide restraint to the plurality of airbags during events with combined vertical and forward velocity.

11. The system as recited in claim 1, wherein the protective cover forms a portion of the fuselage that resists aerodynamic loads experienced during use.

\* \* \* \* \*